US007809206B2

(12) United States Patent
Ishizaka

(10) Patent No.: US 7,809,206 B2
(45) Date of Patent: Oct. 5, 2010

(54) IMAGE PROCESSING APPARATUS FOR GENERATING SUB-SELF-SIMILAR SETS

(75) Inventor: Kanya Ishizaka, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 993 days.

(21) Appl. No.: 11/600,144

(22) Filed: Nov. 16, 2006

(65) Prior Publication Data
US 2007/0206876 A1  Sep. 6, 2007

(30) Foreign Application Priority Data
Mar. 6, 2006  (JP)  ............................. 2006-059477

(51) Int. Cl.
  *G06K 9/46*  (2006.01)
(52) U.S. Cl. ..................................... 382/249
(58) Field of Classification Search ................. 382/249
  See application file for complete search history.

(56) References Cited

U.S. PATENT DOCUMENTS

| | | | | |
|---|---|---|---|---|
| 4,941,193 A | * | 7/1990 | Barnsley et al. ............. | 382/249 |
| 5,065,447 A | * | 11/1991 | Barnsley et al. ............. | 382/249 |
| 5,768,437 A | * | 6/1998 | Monro et al. ............... | 382/249 |
| 5,838,832 A | * | 11/1998 | Barnsley ..................... | 382/249 |
| 6,460,068 B1 | * | 10/2002 | Novaes ........................ | 718/102 |
| 2001/0014181 A1 | * | 8/2001 | Craver et al. ................ | 382/276 |
| 2003/0215131 A1 | * | 11/2003 | Lee et al. .................... | 382/162 |
| 2005/0129314 A1 | * | 6/2005 | Chen ........................... | 382/209 |

OTHER PUBLICATIONS

Hutchinson J., "Fractals and Self-Similarity," 1981, Indiana Univ. Math J. 30, pp. 713-747.
Barnsley M., "Fractals Everywhere," 1988, Academic Press.
Falconer K., "Techniques in Fractal Geometry," 1997, John Wiley & Sons.
Hata M., "On the Structure of Self-Similar Sets," 1985, Japan J. Appl. Math. 2, pp. 381-414.
Dubuc S., "Approximations of Fractal Sets," 1990, Journal of Computational and Applied Mathematics 29, pp. 79-89.
Bandt C., "Self-Similar Sets 3: Construction with Sofic Systems," 1989, Mh. Math 108, pp. 89-102.

(Continued)

*Primary Examiner*—Bhavesh M Mehta
*Assistant Examiner*—David P Rashid
(74) *Attorney, Agent, or Firm*—Oliff & Berridge PLC

(57) ABSTRACT

An image processing apparatus generates a sub-self-similar set F, which is a subset of a self-similar set A with respect to contraction maps f1, . . . , fn and forms an image expressing the sub-self-similar set F. The apparatus includes a base-address-set designating section, a generation-rule acquiring section and a sub-self-similar set generating section. The base-address-set designating section selects m addresses each of which formed of infinite sequence of $\{1, \ldots, n\}$ and generates a base address set M including the selected addresses. The generation-rule acquiring section acquires a rule of generating a hypothetical sub-self-similar set G, which is a subset of a hypothetical self-similar set B with respect to n hypothetical contraction maps g1, . . . , gn, by using the generated base address set M. The sub-self-similar set generating section generates a sub-self-similar set F, which is a subset of the self-similar set A.

14 Claims, 17 Drawing Sheets

OTHER PUBLICATIONS

Bandt C., "Self-Similar Sets 2: A Simple Approach to the Topological Structure of Fractals," 1991, Math. Nachr. 154, pp. 27-39.

Kameyama A., "Self-Similar Sets from the Topological Point of View," 1993, Japan J. Indust. Appl. Math. 10, pp. 85-95.

* cited by examiner $$f_1\begin{pmatrix}x\\y\end{pmatrix} = \frac{\sqrt{5}-1}{2}\begin{pmatrix}-1 & 0\\0 & 1\end{pmatrix}\begin{pmatrix}x\\y\end{pmatrix} + \frac{\sqrt{5}-1}{2}\begin{pmatrix}1\\0\end{pmatrix}$$

$$f_2\begin{pmatrix}x\\y\end{pmatrix} = \frac{\sqrt{5}-1}{2}\begin{pmatrix}\cos\frac{2\pi}{3} & -\sin\frac{2\pi}{3}\\ \sin\frac{2\pi}{3} & \cos\frac{2\pi}{3}\end{pmatrix}\begin{pmatrix}x\\y\end{pmatrix}$$

00110101010101010
11101010101010101

BASE ADDRESS SET
 M = {112(21), 22(21)}

GENERATION ADDRESS SET
 P = {12(21), 2(21), (21), (12)}

G IS THE SMALLEST PARTIAL CONTINUUM
CONTAINING P AMONG PARTIAL CONTINUA OF A.
G IS SUB-SELF-SIMILAR SET EXPRESSED AS:
 $G = G_1 \cup G_2 \cup G_3 \cup G_4 \cup G_5$
WHERE $G_1, G_2, G_3, G_4$ AND $G_5$ ARE
GIVEN BY FOLLOWING SOFIC SYSTEMS:
 $G_1 = f_1(G_4)$
 $G_2 = f_1(G_5)$
 $G_3 = f_1(G_2) \cup f_1(G_3) \cup f_2(G_5)$
 $G_4 = f_2(G_1) \cup f_2(G_3)$
 $G_5 = f_2(G_4)$ $$f_1\begin{pmatrix} x \\ y \end{pmatrix} = \frac{1}{\sqrt{2}} \begin{pmatrix} -\cos\frac{\pi}{2} & -\sin\frac{\pi}{2} \\ -\sin\frac{\pi}{2} & \cos\frac{\pi}{2} \end{pmatrix} \begin{pmatrix} x \\ y \end{pmatrix}$$

$$f_2\begin{pmatrix} x \\ y \end{pmatrix} = \frac{1}{\sqrt{2}} \begin{pmatrix} -1 & 0 \\ 0 & 1 \end{pmatrix} \begin{pmatrix} x \\ y \end{pmatrix} + \begin{pmatrix} 0 \\ 1 - \frac{1}{\sqrt{2}} \end{pmatrix}$$

FIG. 14

① DESCRIPTION ON CASE WHERE M IS DETERMINED FROM OVERLAP PORTION OF A

SELF SIMILAR SET: $A = f_1(A) \cup f_2(A)$

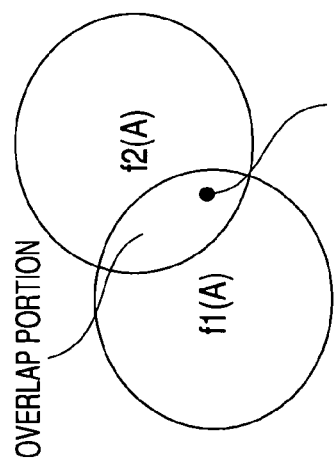

ONE POINT x IN OVERLAP PORTION: $x \in f_1(A) \cap f_2(A)$

② EXTRACT ADDRESS OF x:

$s = s_1 s_2 \ldots s_k \ldots$
$t = t_1 t_2 \ldots t_k \ldots$

WHERE EACH OF $s_i$ AND $t_i$ TAKES A VALUE OF 1 OR 2. THE ADDRESS SATISFIES THE FOLLOWING RELATION.

$\phi^t(s) = f_{s_1} f_{s_2} \ldots f_{s_k} \ldots (x)$

FOR EXAMPLE,
$s = 1(\overline{12})$
$t = 2\overline{2(21)}$
(EACH NUMERICAL VALUE PUT IN PARENTHESES MEANS THAT THE NUMERAL VALUE CONTINUES INFINITELY.)

③ BASE ADDRESS SET M:
$M = \{s, t\}$
GENERATION ADDRESS SET P:
$P = \bigcup_{i=0}^{\infty} \sigma^i(M)$
WHERE
$\sigma(s_1 s_2 \ldots s_k \ldots) = s_2 s_3 \ldots s_k \ldots$
FOR EXAMPLE,
$M = \{1(\overline{12}), 22(\overline{21})\}$
$P = \{1(\overline{12}), 22(\overline{21}), (\overline{12}), 2(\overline{21}), (\overline{21})\}$

④ PREPARE HYPOTHETICAL CONTRACTION MAPS g1 AND g2 WITH ONLY M AS OVERLAP PORTION THEREBETWEEN:

SELF-SIMILAR SET:
$B = g_1(B) \cup g_2(B)$

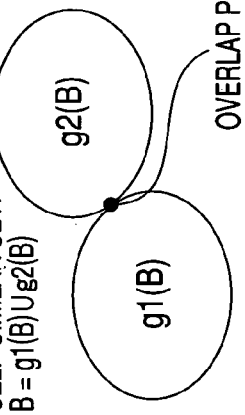

OVERLAP POINT y:
$\{y\} = g_1(B) \cap g_2(B)$

ADDRESS OF y IS THE SAME (s, t) AS THAT OF x.

FROM FIG. 14

⑤

A SUB-SELF-SIMILAR SET G ON B IS CONSTRUCTED WITH SOFIC SYSTEMS.
$G = \cap \{K | K: \text{PARTIAL CONTINUUM OF } B \text{ SATISFYING } \phi g(P) \subset K\}$ THE SOFIC SYSTEMS ARE FORMED AS
$G_i = \cup \{g_l(G_j) | (l, j) \in Q_i\}$ FOR $i = 1, ..., k$
WHERE
$Q_i \subset \{1, 2\} \times \{1, ..., k\}, Q_i \neq \Phi.$
THE SOFIC SYSTEMS SATISFY
THE FOLLOWING RELATION.
$G = \bigcup_{i=1}^{k} G_i$ G IS A SUB-SELF-SIMILAR SET OF g1, g2.
FOR EXAMPLE,
$G = G_1 \cup G_2 \cup G_3$
WHERE
$G_1 = g_1(G_1) \cup g_1(G_2) \cup g_2(G_3)$
$G_2 = g_2(G_1)$
$G_3 = g_2(G_2)$

⑥

THE FORMED SOFIC SYSTEMS ARE FORMED ON THE ORIGINAL CONTRACTION MAPS f1, f2.
$F = \bigcup_{i=1}^{k} F_i$
WHERE
$F_i = \cup \{f_l(F_j) | (l, j) \in Q_i\}$ FOR $i = 1, ..., k$
IF
$Q_i \subset \{1, 2\} \times \{1, ..., k\}, Q_i \neq \Phi.$ FOR EXAMPLE,
$F = F_1 \cup F_2 \cup F_3$
WHERE
$F_1 = f_1(F_1) \cup f_1(F_2) \cup f_2(F_3)$
$F_2 = f_2(F_1)$
$F_3 = f_2(F_2)$ F IS THE OBTAINED SUB-SELF-SIMILAR SET OF f1, f2.
(THE POINT x IS INCLUDED IN F.)

A SUB-SELF-SIMILAR SET G ON B IS
CONSTRUCTED WITH SOFIC SYSTEMS.
$G = \cap \{K | K: \text{PARTIAL CONTINUUM OF } B \text{ SATISFYING } \phi_g(P) \subset K\}$ THE SOFIC SYSTEMS ARE FORMED AS
$G_i = \cup \{g_i(G_j) | (i,j) \in Q_i\}$ FOR $i = 1, ..., k$
WHERE
$G = \bigcup_{i=1}^{k} G_i$
$Q_i \subset \{1, 2\} \times \{1, ..., k\}, Q_i \neq \Phi$.
THE SOFIC SYSTEMS SATISFY
THE FOLLOWING RELATION.

G IS A SUB-SELF-SIMILAR SET OF $g_1, g_2$.
FOR EXAMPLE,
$G = G_1 \cup G_2 \cup G_3$
WHERE
$G_1 = g_1(G_1) \cup g_1(G_2) \cup g_2(G_3)$
$G_2 = g_2(G_1)$
$G_3 = g_2(G_2)$

FROM FIG. 16

⬆

⑥

THE FORMED SOFIC SYSTEMS ARE
FORMED ON THE ORIGINAL CONTRACTION
MAPS $f_1, f_2$.
$F = \bigcup_{i=1}^{k} F_i$
WHERE
$F_i = \cup \{f_i(F_j) | (i,j) \in Q_i\}$ FOR $i = 1, ..., k$
IF
$Q_i \subset \{1, 2\} \times \{1, ..., k\}, Q_i \neq \Phi$.

FOR EXAMPLE,
$F = F_1 \cup F_2 \cup F_3$
WHERE
$F_1 = f_1(F_1) \cup f_1(F_2) \cup f_2(F_3)$
$F_2 = f_2(F_1)$
$F_3 = f_2(F_2)$ F IS THE OBTAINED SUB-SELF-SIMILAR SET OF $f_1, f_2$.
(THE POINT x IS INCLUDED IN F.)

IMAGE PROCESSING APPARATUS FOR GENERATING SUB-SELF-SIMILAR SETS

BACKGROUND

1. Technical Field

The invention relates to an image processing technique for forming a fractal image by using a sub-self-similar set and particularly for making it possible to generate a sub-self-similar set easily.

2. Description of the Related Art

A self-similar set decided from a group of contraction maps is known well as a typical example of fractal. The self-similar set is a set, which is uniquely decided from contraction maps f1, . . . , fn in a complete metric space. The self-similar set is defined as a compact set A satisfying A= $\cup_{i-1}^n f_i(A)$. The definition of the self-similar set is well known, for example, in Non-Patent Document 1-3.

The self-similar set has such a characteristic that the set itself is formed of a sum of n contracted copies. As self-similar sets, there are sets having various forms such as sets named "Cantor set", "Koch curve", "Levy curve", "Sierpinski Triangle" and "Takagi curve." Particularly, it is known that a part of the self-similar sets are models suitable for complex forms existing in the natural world. For example, the Hata's tree-like set and the Barnsley's fern will correspond to this type of self-similar sets. More generally, it is known that a complex form can be approximated as a self-similar set when contraction maps are selected wisely. Characteristics of these self-similar fractals have been described in detail, for example, in Non-Patent Document 1-3. Such a self-similar set can be drawn easily by a method such as random iteration algorithm or deterministic algorithm described in detail, for example, in Non-Patent Document 2.

The self-similar set can give a model preferred in terms of representation of a complex form or a natural form as described above. However, the number of contraction maps generally increases if it is attempted to obtain a form approximate to an arbitrary form from the self-similar set. Moreover, the approximation of the form on this occasion is based on a distance called "Hausdorff distance." Therefore, the distance may be different from a distance visually recognized by a human being. In addition, there is a directionality of giving a complex form "likelihood" as another directionality concerned with use of the self-similar set. This directionality may be thought to be a rather preferred directionality in terms of characteristics of the self-similar set. However, an artificial factor remains in the obtained form because of the limitation of "self-similar".

On the other hand, a compact set P satisfying $F \subset \cup_{i=1}^n f_i(F)$ with respect to the contraction maps f1, . . . , fn is called "sub-self-similar set." That is, the sub-self-similar set has such a characteristic that the subset itself is included in a set formed of a sum of n contracted copies. The sub-self-similar set is different from the self-similar set in that the sub-self-similar set cannot be decided uniquely. The sub-self-similar set may include a large number of sets. The self-similar set A itself and a boundary set of the self-similar set A satisfy the definition of the sub-self-similar set. As is obvious from this fact, the sub-self-similar set may be said to have a more general figure than that of a fractal decided from a group of contraction maps. Incidentally, mathematical characteristics of the sub-self-similar set have been described in detail, for example, in Non-Patent Document 3.

Because the sub-self-similar set has a wide set including a self-similar set, it is a matter of course that the sub-self-similar set is thought to be more suitable for representation of the complex form of the self-similar set than the self-similar set. Nothing but construction with sofic systems, for example, as disclosed in Non-Patent Document 6 has been however known as a method for drawing the sub-self-similar set. Although these techniques can provide a general method of constructing a sub-self-similar set, it is impossible to know or designate the form of the obtained sub-self-similar set by analogy. For example, it is impossible to obtain a sub-self-similar set having an intended form.

[Non-Patent Document 1] Hutchinson, "Fractals and self-similarity", Indiana Univ. Math. J. 30 (1981) 713-747.

[Non-Patent Document 2] Barnsley, "Fractals Everywhere" second edition, Academic Press (1993).

[Non-Patent Document 3] Falconer, "Techniques in Fractal Geometry", John Wiley & Sons (1997).

[Non-Patent Document 4] Hata, "On the structure of self-similar sets", Japan J. Appl. Math. 2 (1985) 381-414.

[Non-Patent Document 5] S. Dubuc, A. Elqortobi, "Approximations of fractal sets", J. comput. Appl. Math. 29 (1990) 79-89.

[Non-Patent Document 6] Bandt, "Self-similar sets 3. Construction with sofic systems", Mh. Math. 108 (1989) 89-102.

[Non-Patent Document 7] Bandt, Keller, "Self-similar sets 2. A simple approach to the topological structure of fractals", Math. Nachr. 154 (1991) 27-39.

[Non-Patent Document 8] Kameyama, "Self-similar sets from the topological point of view", Japan J. Ind. Appl. Math. 10 (1993) 85-95.

SUMMARY

According to an aspect of the invention, an image processing apparatus generates a sub-self-similar set F, which is a subset of a self-similar set A formed of plural contraction maps f1, . . . , fn where n is a natural number and larger than 1, and forms an image expressing the sub-self-similar set F. The apparatus includes a base-address-set designating section, a generation-rule acquiring section and a sub-self-similar set generating section. The base-address-set designating section selects m addresses each of which formed of infinite sequence of {1, . . . , n} and generates a base address set M including the selected addresses. The generation-rule acquiring section acquires a rule of generating a hypothetical sub-self-similar set G, which is a subset of a hypothetical self-similar set B formed of n hypothetical contraction maps g1, . . . , gn, by using the generated base address set M. The sub-self-similar set generating section generates a sub-self-similar set F, which is a subset of the self-similar set A, by applying the acquired generation rule to the contraction maps f1, . . . , fn.

Incidentally, the invention can be achieved not only as an apparatus or system but also as a method. It is a matter of course that a part of the invention may be formed as software. It is also a matter of course that a software product used for making such software executed by a computer is included in the technical scope of the invention.

The aforementioned and other aspects of the invention will be described in claims and described in detail in the following exemplary embodiments.

BRIEF DESCRIPTION OF THE DRAWINGS

FIG. 14 is a view for typically explaining the first and second examples of the exemplary embodiment;

FIG. 15 is a view for typically explaining the first and second examples of the exemplary embodiment;

FIG. 17 is a view (the same as FIG. 15) for typically explaining the third example of the exemplary embodiment.

DETAILED DESCRIPTION

Exemplary embodiments of the invention will be described below.

An image processing system according to the exemplary embodiments of the invention will be described below in detail. The image processing system generates a sub-self-similar set and generates a fractal image on the basis of the sub-self-similar set.

Figure 1:
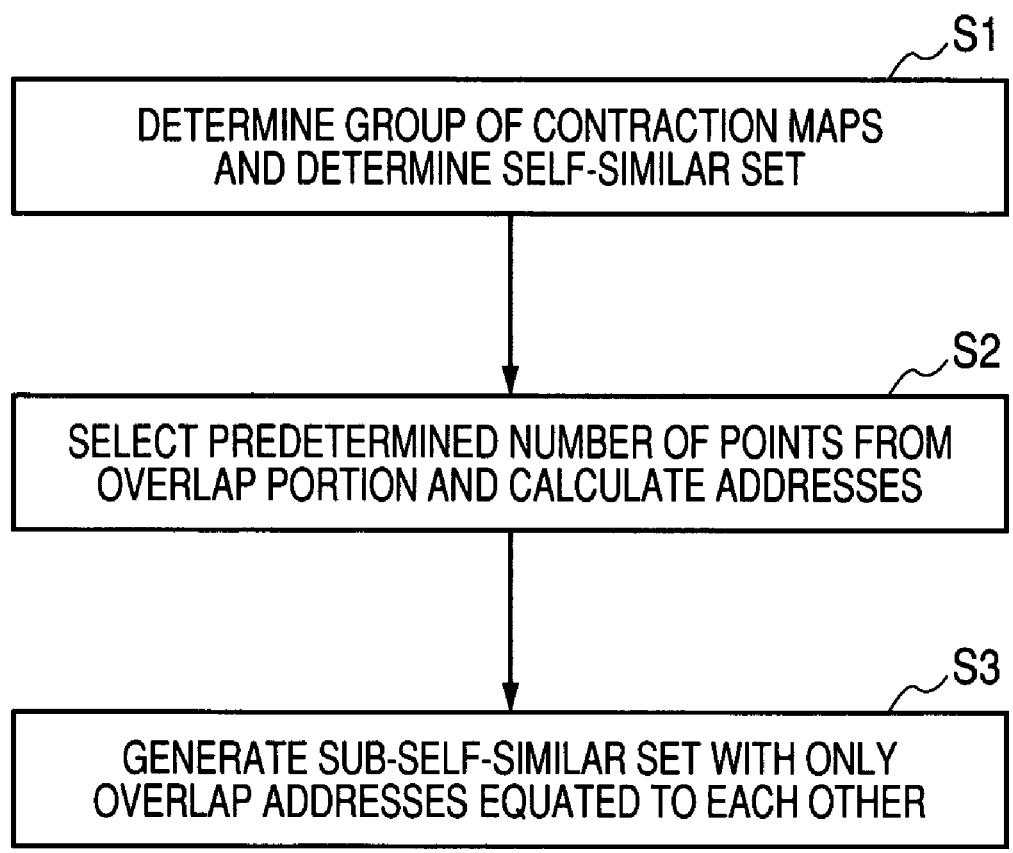
FIG. 1 is a flow chart for explaining a processing flow in an image processing system according to an exemplary embodiment of the invention.

FIG. 1 shows the outline of a processing flow in the image processing system 100 (see FIG. 2) according to the exemplary embodiment. The processing flow will be described below.

[Determine Contraction Map Group and Determine Self-Similar Set (Step S1)]

Figure 3:
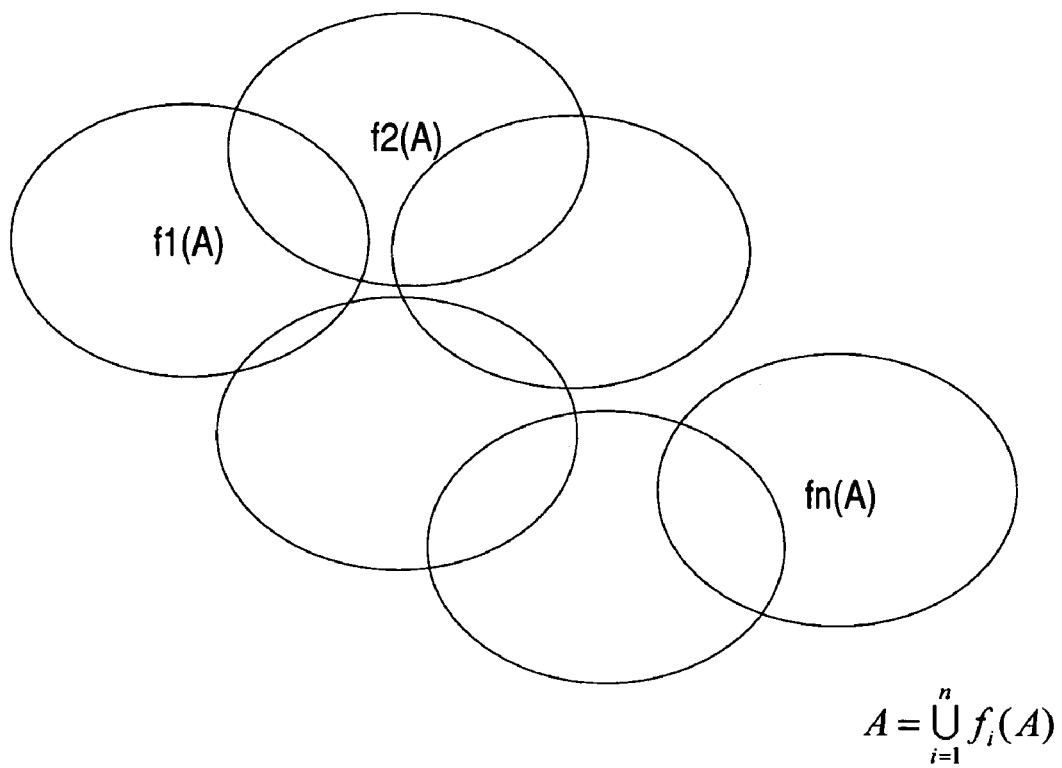
FIG. 3 is a view for explaining an arcwise connected self-similar set in the exemplary embodiment.

First, a self-similar set A with respect to contraction maps f1, ..., fn is formed. On this occasion, it is preferable that the self-similar set A is arcwise connected, that is, for any two points x and y in X, there is a homeomorphism f from I to X such that $f(0)=x$, $f(1)=y$. In this case, as shown in FIG. 3, the arcwise connectedness of the self-similar set A is equivalent to the fact that arbitrary fi(A) and fj(A) is connected by a connected path which consists of some $\{fk_1(A):$ each $k_1$ is in $\{1, \ldots, n\}\}$. Incidentally, this fact is known well by Non-Patent Document 4.

Although random iteration algorithm or deterministic algorithm described in detail in Non-Patent Document 2 can be used as a method for constructing the self-similar set A, a method described in detail in Non-Patent Document 5 and temporarily called "density equalization method" may be often used more preferably when a map having low reduction ratio (reduction ratio nearby 1.0) is contained in some of the respective contraction maps {fi}.

[Select a Predetermined Number of Points from Overlap Portions/Calculate Address (Step S2)]

Next, a base address set M is given. In order to give the base address set X, a predetermined number of points $a_1, \ldots, a_p$ are selected from overlap portions of the self-similar set A formed thus. On this occasion, the "overlap portions" are defined by whole portions of $f_i(A) \cap f_j(A) \neq \phi$ with different i, j. Let $S\{1, \ldots, n\}$ and $S^\infty\{1, \ldots, n\}^\infty$ with the product topology. It is generally known that for each point in the self-similar set A with respect to f1, ..., fn can be corresponded to a point in $S^\infty$, that is, a symbol $s_1 s_2 \ldots s_k \ldots$ $(s_i \in \{1, \ldots, n\})$ in $S^\infty$ always corresponds to a point $x \in A$ on the self-similar set A by the relation:

$$f_{s_1} f_{s_2} \ldots f_{s_k} \ldots (A) = x$$

(in which the left side member is hereinafter referred to as $\phi_f(s)$). The symbol $s_1 s_2 \ldots s_k \ldots$ is called "address of point x". This relation between the self-similar set and the symbolic space has been described in detail, for example, in Non-Patent Document 1-3.

Therefore, respective addresses of the selected points $a_1, \ldots, a_p$ are calculated in accordance with this rule. Attention must be paid to the fact that each $a_i$ ($i=1, \ldots, p$) has plural addresses when such symbols are related to the points on the overlap portion. For example, when a point $a_1$ is selected from $f_i(A) \cap f_j(A)$, the point $a_1$ corresponds to at least two addresses $$s_1 s_2 \ldots s_k \ldots$$

$$t_1 t_2 \ldots t_k \ldots$$

where $s_1 = i$ and $t_1 = j$.

Therefore, in the condition that such addresses are selected for respective points, the whole of the addresses is called "base address set" and put as M. On this occasion, attention must be paid to the fact that M includes at least 2p elements.

The aforementioned construction method has been described on the case where addresses of overlap points selected from A are calculated and the whole of the addresses is put as M. However, the invention is not limited thereto. M may be given arbitrarily.

[Construct Sub-Self-Similar Set with Overlap Addresses Equated to Each Other (Step S3)]

Next, a shift map σ for each address $s = s_1 s_2 \ldots s_k \ldots (\in M)$ of M is defined by the following.

$$\sigma(s) = s_2 s_3 \ldots s_k \ldots$$

That is, σ is defined as an arithmetic operation for removing the top address number of s. Moreover, a generation address set P is defined by the following.

$$P = \cup_{i=1}^\infty \sigma^i(M)$$

Assume now the case where P is a finite set. Attention must be paid to the fact that respective elements of M have to be eventually periodic in order to provide P as a finite set, that is, respective elements are fallen into periodic points when mapping σ is performed a finite number of times.

Here, consider a group of hypothetical contraction maps g1, ..., gn. Assume that a hypothetical self-similar set B with respect to hypothetical contraction maps g1, ..., gn is arcwise connected, and that addresses of overlap portions of the hypothetical self-similar set B coincide with M. That is, assume that M satisfies the following relation.

$$M = \cup_{i-j} (\phi_g^{-1} g_i(B) \cap \phi_g^{-1} g_j(B))$$

At this time, let a set $G = \cap \{K | K:$ sub-continuum of B and $\phi_g(P) \subset K\}$. The set G satisfies the characteristic of a sub-self-similar set. Moreover, when the construction by a symbolic dynamics called "sofic system" is used, the set G can be decomposed into a sum of a finite number of compact sets:

$$G = \cup_{i=1}^{k} G_j.$$

Here, each $G_i$ is expressed as:

$$G_i = \cup \{g_l(G_j)(l,j) \epsilon Q_1\} \text{ for } i=1, \ldots, k$$

where sets $Q_1, \ldots, Q_k$ satisfy the expression:

$$Q_i \subset \{1, \ldots, n\} \times \{1, \ldots, k\}, Q_i \neq \Phi$$

Incidentally, the general relation between the sofic system and the self-similar set has been described in detail in Non-Patent Document 6.

The set G constructed as described above is a sub-self-similar set contained in the self-similar set B with respect to hypothetical contraction maps g1, ..., gn. Moreover, from the assumption of the way of taking g1, ..., gn, the address set for the whole overlap portions of $g_i(B) \cap g_j(B)$ with different i, j coincides M. Remark that B or G cannot be drawn actually because g1, ..., gn are hypothetically constructed contraction maps. Therefore, the sets $Q_1, \ldots, Q_k$ selected in the construction of the sofic system are used to let each Fi be as follows.

$$f_i = \cup \{f_l(F_j)(l,j) \epsilon Q_i\} \text{ for } i=1, \ldots, k$$

In this manner, the group of contraction maps f1, ..., fn initially specifically selected are used. On this occasion, F is a sub-self-similar set expressed as follows.

$$F = \cup_{i=1}^{k} F_i$$

F satisfies the relation $A \supset F$. F is a solution to be obtained in this exemplary embodiment of the invention. As described above, a sub-self-similar set can be obtained from addresses of overlap portions of the self-similar set with respect to contraction maps f1, ..., fn. Incidentally, it is apparent from the construction method used in this exemplary embodiment of the invention that the obtained sub-self-similar set F has an arcwise connected characteristic as well.

In connection with the above construction of whole M or partial concept of P, some basic concepts of topological treatment of self-similar sets are well known, for example, in Non-Patent Document 7 or 8.

[Functional Configuration]

Figure 2:
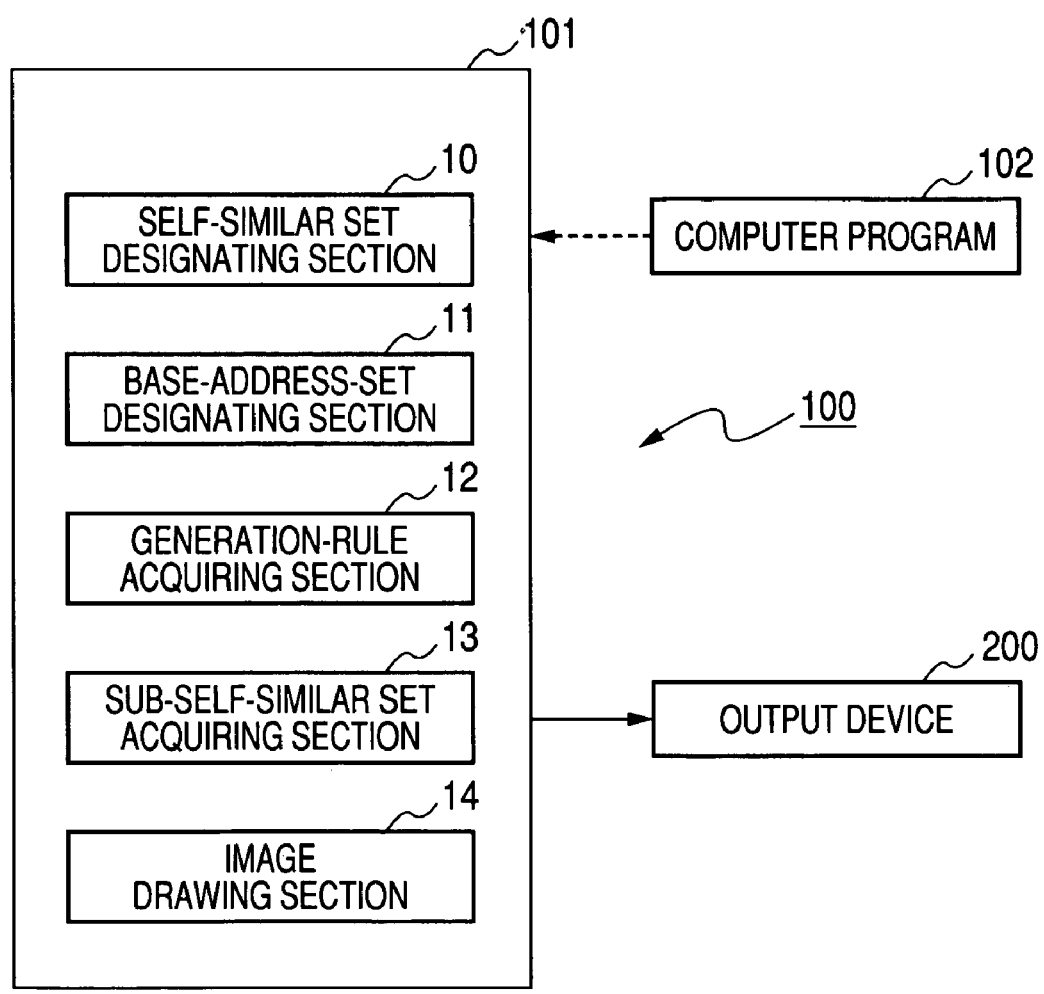
FIG. 2 is a diagram for explaining the functional configuration of the image processing system according to the exemplary embodiment.

FIG. 2 shows the functional configuration of the image processing system 100 according to this exemplary embodiment. In FIG. 2, the image processing system is typically implemented by a computer 101. A computer program 102 for image processing is installed in the computer 101 to construct the image processing system. Incidentally, functional blocks, which will be described below, are typically implemented by cooperation of hardware resources and software resources (such as the computer program 102 for image processing and an operating system) in the computer 101.

In FIG. 2, the image processing system 100 includes a self-similar set designating section 10, a base-address-set designating section 11, a generation-rule acquiring section 12, a sub-self-similar set acquiring section 13 and an image drawing section 14. The computer 101 (e.g. the self-similar set designating section 10) allows a user to input contraction maps f1, ..., fn. The self-similar set designating section 10 forms a self-similar set A with respect to the input contraction maps f1, ..., fn (step S1 in FIG. 1). The base-address-set designating section 11 determines a base address set M based on the input contraction maps f1, ..., fn (step S2 in FIG. 1). The generation-rule acquiring section 12 acquires a rule for constructing a hypothetical sub-self-similar set G in a hypothetical self-similar set B with respect to hypothetical contraction maps g1, ..., gn on the assumption that a whole overlap address set in the self-similar set B with respect to the hypothetical contraction maps g1, ..., gn coincides with the base address set M. The sub-self-similar set acquiring section 13 generates the sub-self-similar set F finally by applying this rule to the original contraction maps f1, ..., fn. The image drawing section 14 forms a fractal image by using the generated sub-self-similar set. The formed fractal image is displayed on a predetermined output device (such as a display device or a print device) 200.

FIRST EXAMPLE

The case where a sub-self-similar set is obtained for a self-similar set with respect to two contraction maps f1 and f2 will be described as a first example of the exemplary embodiment of the invention. In the first example, the sub-self-similar set is generated from a single point as an overlap portion of f1(A) and f2(A).

FIGS. 14 and 15 schematically show the case where the sub-self-similar set is formed of the address of the overlap portion of f1(A) and f2(A). Refer to the schematic drawings suitably (incidentally, the specific address shown in the drawings may be different from that described below.)

Figure 4:
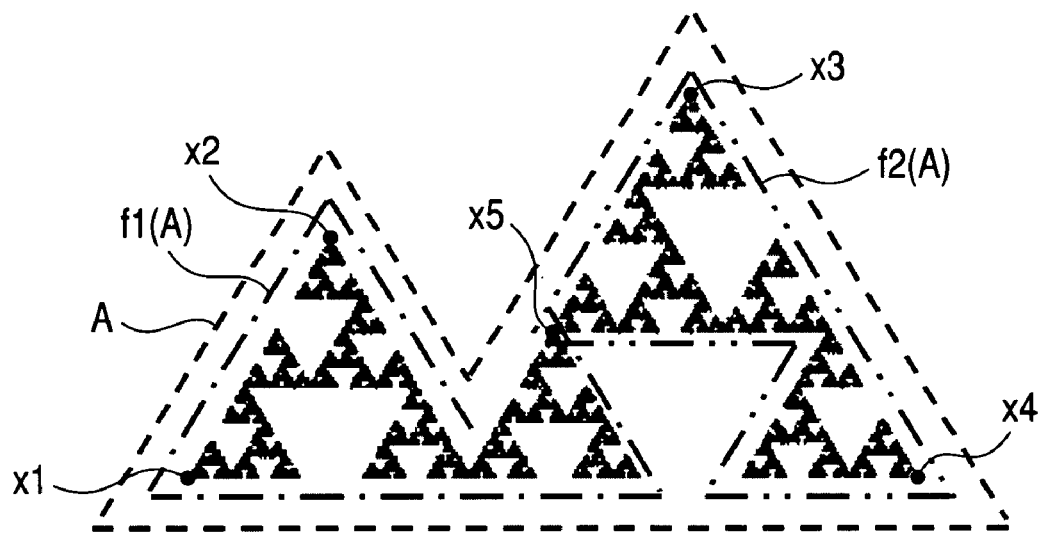
FIG. 4 is a view for explaining a self-similar set as a first example of the exemplary embodiment.

In a first example shown in FIG. 4, it is assumed that a user selects and inputs the following contraction maps f1 and f2 to the computer 101 via a display and an input device (which are not shown).

$$f_1 \begin{pmatrix} x \\ y \end{pmatrix} = \frac{\sqrt{5}-1}{2} \begin{pmatrix} -1 & 0 \\ 0 & 1 \end{pmatrix} \begin{pmatrix} x \\ y \end{pmatrix} + \frac{\sqrt{5}-1}{2} \begin{pmatrix} 1 \\ 0 \end{pmatrix}$$

$$f_2 \begin{pmatrix} x \\ y \end{pmatrix} = \frac{\sqrt{5}-1}{2} \begin{pmatrix} \cos\frac{2\pi}{3} & -\sin\frac{2\pi}{3} \\ \sin\frac{2\pi}{3} & \cos\frac{2\pi}{3} \end{pmatrix} \begin{pmatrix} x \\ y \end{pmatrix}$$

In this case, the self-similar set designating section 10 constructs a self-similar set A $(=f_1(A) \cup f_2(A))$ shown in FIGS. 4 and 14(1). It is noted that the entire pattern of FIG. 4 surrounded by the dashed lines indicates the self-similar set A, that a part of the entire pattern of FIG. 4 surrounded by the chain lines indicates f1(A) and that the other part of the entire pattern of FIG. 4 surrounded by the two-dot chain lines indicates f2(A). In other words, the pattern denoted by f1(A) is painted in deeper black in FIG. 4, and the pattern denoted by f2(A) is painted in lighter black in FIG. 4.

As described above, a desired point x on the self-similar set A always corresponds to a symbol (address) $s_1 s_2 \ldots s_k \ldots$ ($s_i \epsilon \{1,2\}$) (see FIG. 14(2)). For example, the points x1 to x4 shown in FIG. 4 correspond to addresses (12), 12(21), 2(21) and (21), respectively. Each numerical value in parentheses means that the numerical value continues infinitely. That is, for example, the address (12) of the point x1 means that the infinite contraction map f1f2f1f2f1f2 ... (A) converges to the point x1. Also, the point x5 shown in FIG. 4 corresponds to two addresses, that is, 112(21) and 22(21). This is because the point x5 is in the overlap portion of f1(A) and f2(A), that is, $x_5 \in f_1(A) \cap f_2(A)$. Indeed, it is noted that in the first example, $f_1(A) \cap f_2(A)$ only contains the point x5. Therefore, the base address set is given by M={112(21), 22(21)}. Since the self-similar set A obtained by the self-similar set designating section 10 includes the single point x5 in the overlap portion $f_1(A) \cap f_2(A)$, the base-address-set designating section 11 obtains the base address set M (={112 (21), 22(21)}) from the self-similar set A, $f_1(A)$ and $f_2(A)$. Even in the first example, the base-address-set designating section 11 may request the user to designate one point from the overlap portion $f_1(A) \cap f_2(A)$.

Then, the generation-rule acquiring section 12 obtains the generation address set P based on the base address set M. In this first example, P={12(21), 2(21), (21), (12)} (see FIG. 14(3)).

The generation-rule acquiring section 12 calculates the sofic system with respect to the generation address set P (see FIGS. 14(4) and 15(5)). Here, the sofic system with respect to P can be calculated relatively simply (algorithm of a second example, which will be described later, may be used) and the sofic system gives the following hypothetical sub-self-similar set G:

$$G = G_1 \cup G_2 \cup G_3 \cup G_4 \cup G_5$$

$$G_1 = g_1(G_4)$$

$$G_2 = g_1(G_5)$$

$$G_3 = g_1(G_2) \cup g_1(G_3) \cup g_2(G_5)$$

$$G_4 = g_2(G_1) \cup g_2(G_3)$$

$$G_5 = g_2(G_4),$$

where each g1 and g2 is hypothetical contraction maps such that satisfies $B = g_1(B) \cup g_2(B)$ and $g_1(B) \cap g_2(B)$ contains a single point with addresses 112(21) and 22(21).

Then, by the same sofic system for the sub-self-similar set G, the sub-self-similar set acquiring section 13 constructs the sub-self-similar set F using the original contraction maps f1 and f2 (see FIG. 15(6)). Thereby, the sub-self-similar set acquiring section 13 obtains a sub-self-similar set F satisfying the following relations:

$$F = F_1 \cup F_2 \cup F_3 \cup F_4 \cup F_5$$

$$F_1 = f_1(F_4)$$

$$F_2 = f_1(F_5)$$

$$f_3 = f_1(f_2) \cup f_1(F_3) \cup f_2(F_5)$$

$$F_4 = f_2(F_1) \cup f_2(F_3)$$

$$F_5 = f_2(f_4)$$

Figure 5:
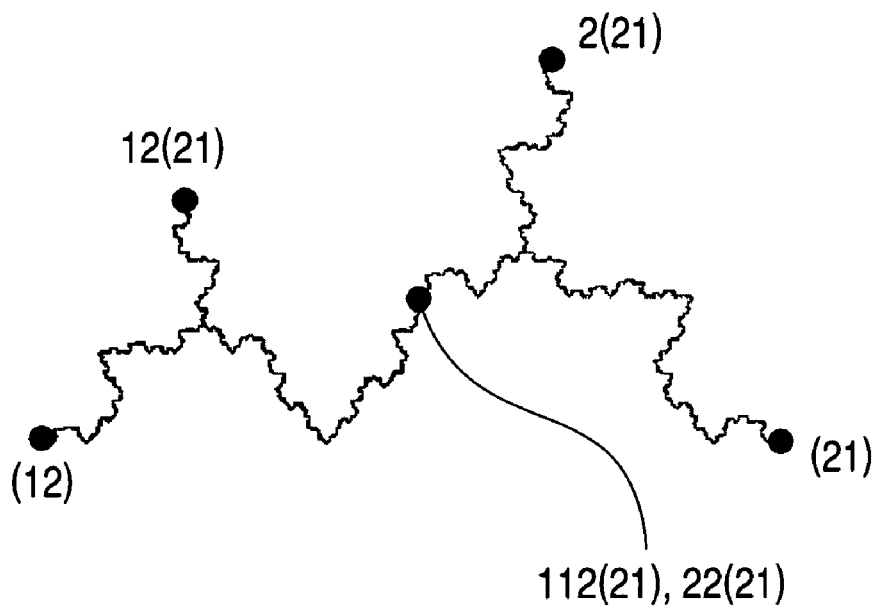
FIG. 5 is a view for explaining a sub-self-similar set in the first example of the exemplary embodiment.

FIG. 5 shows the thus obtained sub-self-similar set F. It is apparent that F satisfies the relation A ⊃ F with respect to the self-similar set A. Incidentally, such a sub-self-similar set can be drawn when a mapping rule due to a directed graph is provided for the aforementioned random iteration algorithm.

As is obvious in this first example, selecting the base address set M from addresses of the overlap points in the self-similar set A permits the sub-self-similar set F to have an arcwise connected characteristic. When, for example, the base address set M is determined arbitrarily, there is generally no guarantee that resultant sub-self-similar set F will have an arcwise connected characteristic. Actually, when the base address set M is determined from other addresses rather than the addresses of the overlap points in the self-similar set A, it is possible to construct a sub-self-similar set but the resultant sub-self-similar set F cannot have any arcwise connected characteristic.

Incidentally, the self-similar set A in this example has the Hausdorff dimension of about 1.44 whereas the sub-self-similar set G has the Hausdorff dimension of about 1.17. It can be confirmed that the complexity of the sub-self-similar set is lower. On the other hand, even in the case where a sub-self-similar set has the same topological structure as that of G which is contained in another self-similar set having the same Hausdorff dimension and topological structure as those of A, the Hausdorff dimension of the sub-self-similar set does not always equal to that of G. Although it is difficult to apply the strict sense of the property concerned with these dimension values, the property concerned with these dimension values may be helpful in understanding that the complexity (in terms of Housdorff dimension) does not always have relation with the topological structure.

As described above, the address of the overlap point can be calculated for the self-similar set with respect to the two contraction maps f1 and f2. Therefore, a sub-self-similar set with the generation set by the address can be formed. Incidentally, in the first example, because the relation $M = \phi^{-1} f_1(A) \cap \phi^{-1} f_2(A)$ is satisfied initially, the contraction maps f1 and f2 may be used directly as hypothetical contraction maps g1 and g2. The first example is the simplest example for extracting a sub-self-similar set included in the self-similar set. That is, the number of elements of P is small and formation of the sofic system is simple. Because the overlap portion consists of a single-point set originally, the generated sub-self-similar set is not rich in form and kind. Therefore, a method for extracting a sub-self-similar set from a self-similar set, which has a large overlap portion, will be described in the following second example.

SECOND EXAMPLE

Another case where a sub-self-similar set is obtained for a self-similar set formed of two contraction maps f1 and f2 will be described as a second example of the exemplary embodiment of the invention. In the second example, it is assumed that a user selects and inputs the following contraction maps f1 and f2 to the computer 101 via the display and the input device (which are not shown).

$$f_1 \begin{pmatrix} x \\ y \end{pmatrix} = \frac{1}{\sqrt{2}} \begin{pmatrix} -\cos\frac{\pi}{2} & -\sin\frac{\pi}{2} \\ -\sin\frac{\pi}{2} & \cos\frac{2\pi}{2} \end{pmatrix} \begin{pmatrix} x \\ y \end{pmatrix}$$

$$f_2 \begin{pmatrix} x \\ y \end{pmatrix} = \frac{1}{\sqrt{2}} \begin{pmatrix} -1 & 0 \\ 0 & 1 \end{pmatrix} \begin{pmatrix} x \\ y \end{pmatrix} + \begin{pmatrix} 0 \\ 1 - \frac{1}{\sqrt{2}} \end{pmatrix}$$

Figure 6:
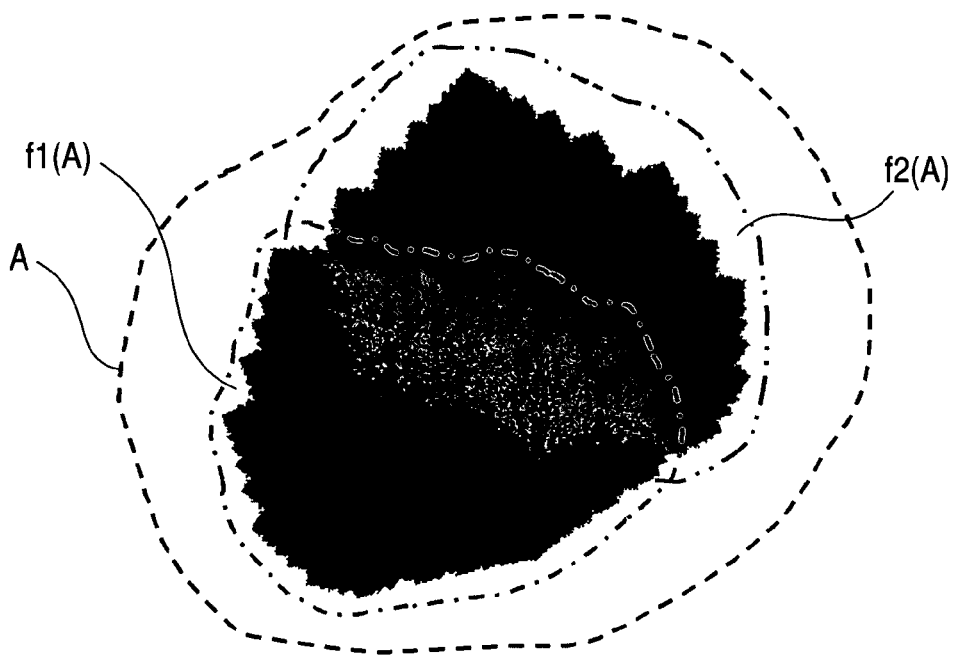
FIG. 6 is a view for explaining a self-similar set as a second example of the exemplary embodiment.
Figure 7:
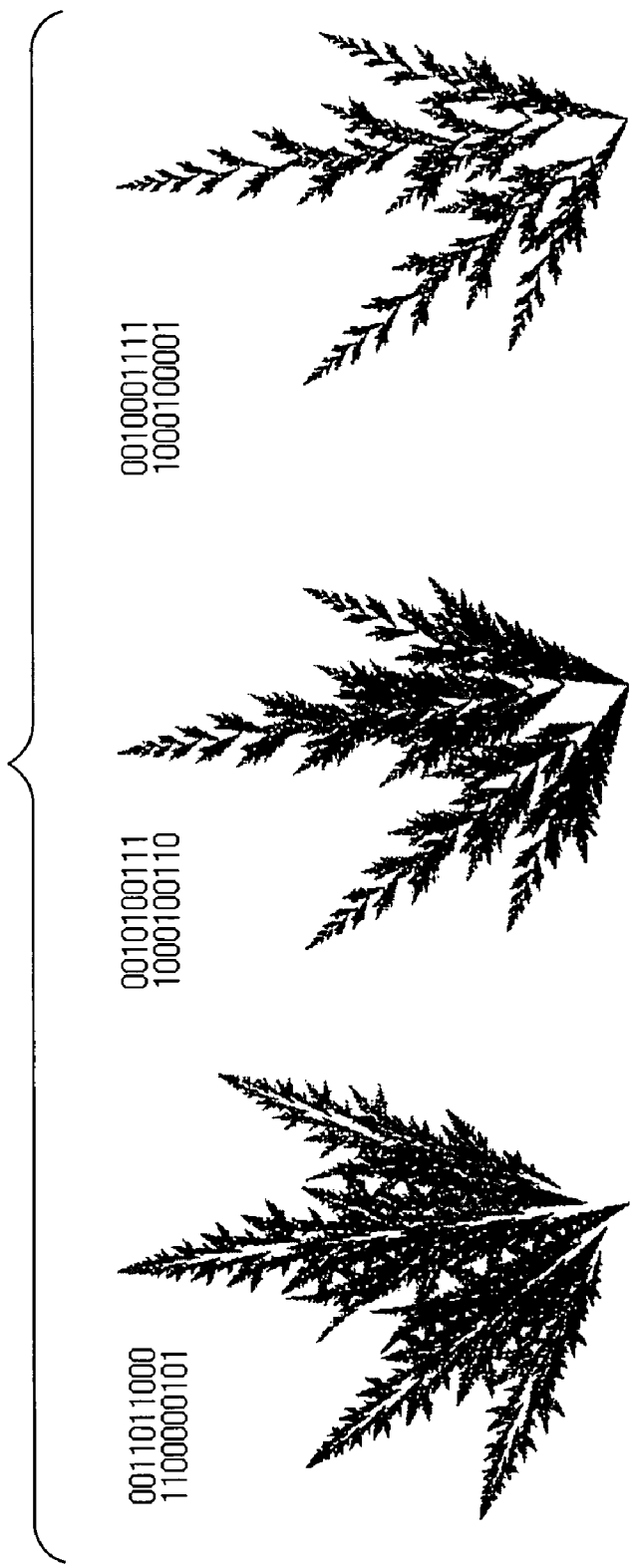
FIG. 7 is a view for explaining a sub-self-similar set (1) in the second example of the exemplary embodiment.
Figure 8:
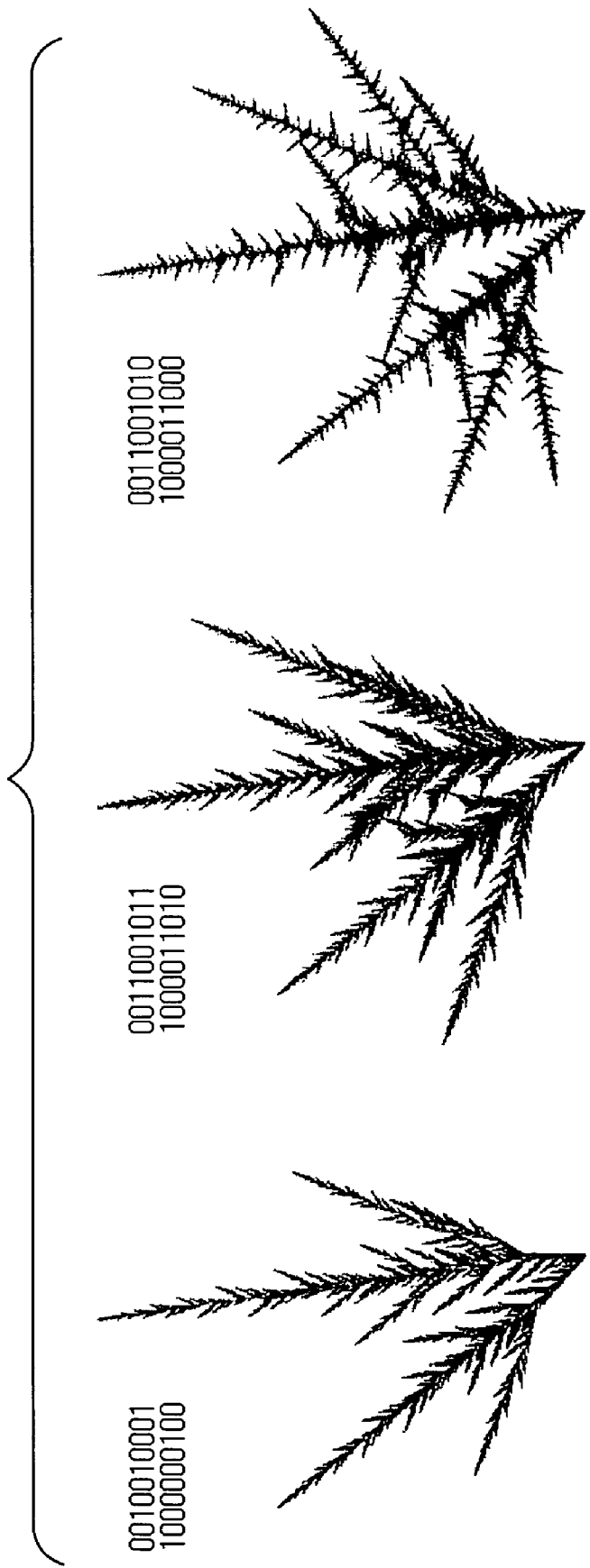
FIG. 8 is a view for explaining a sub-self-similar set (2) in the second example of the exemplary embodiment.
Figure 9:
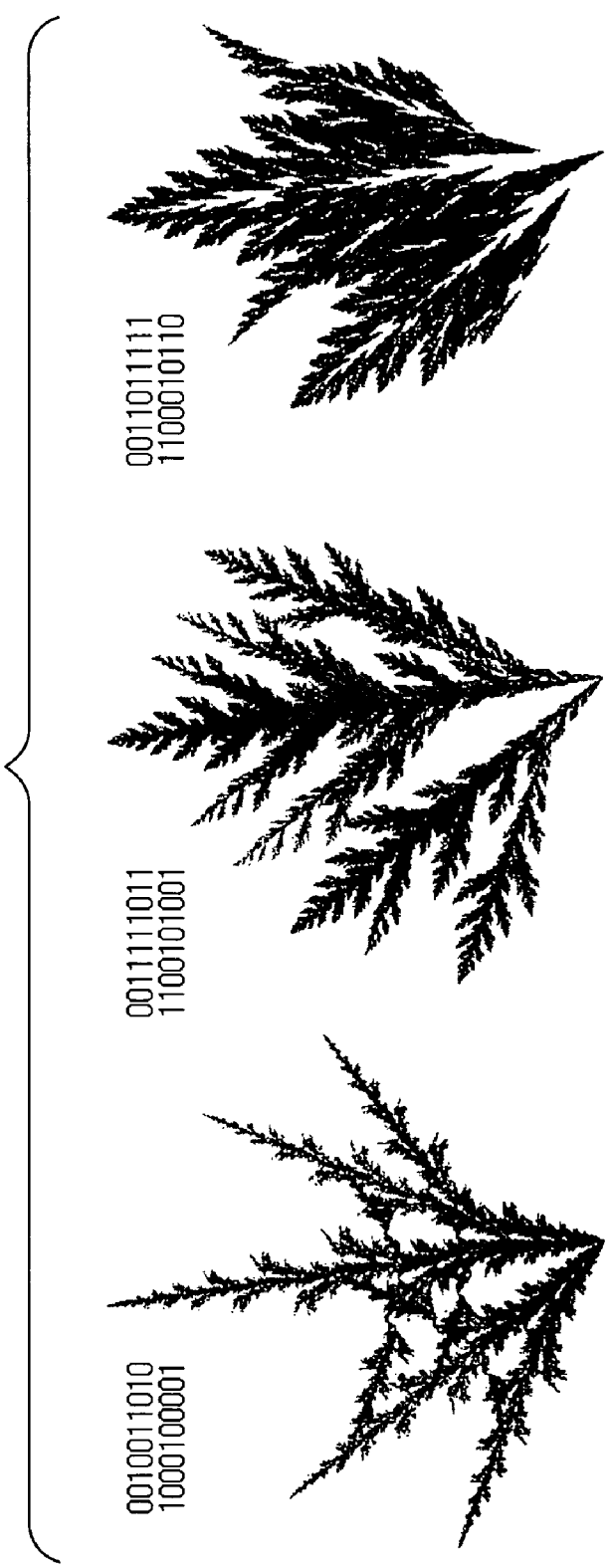
FIG. 9 is a view for explaining a sub-self-similar set (3) in the second example of the exemplary embodiment.
Figure 10:
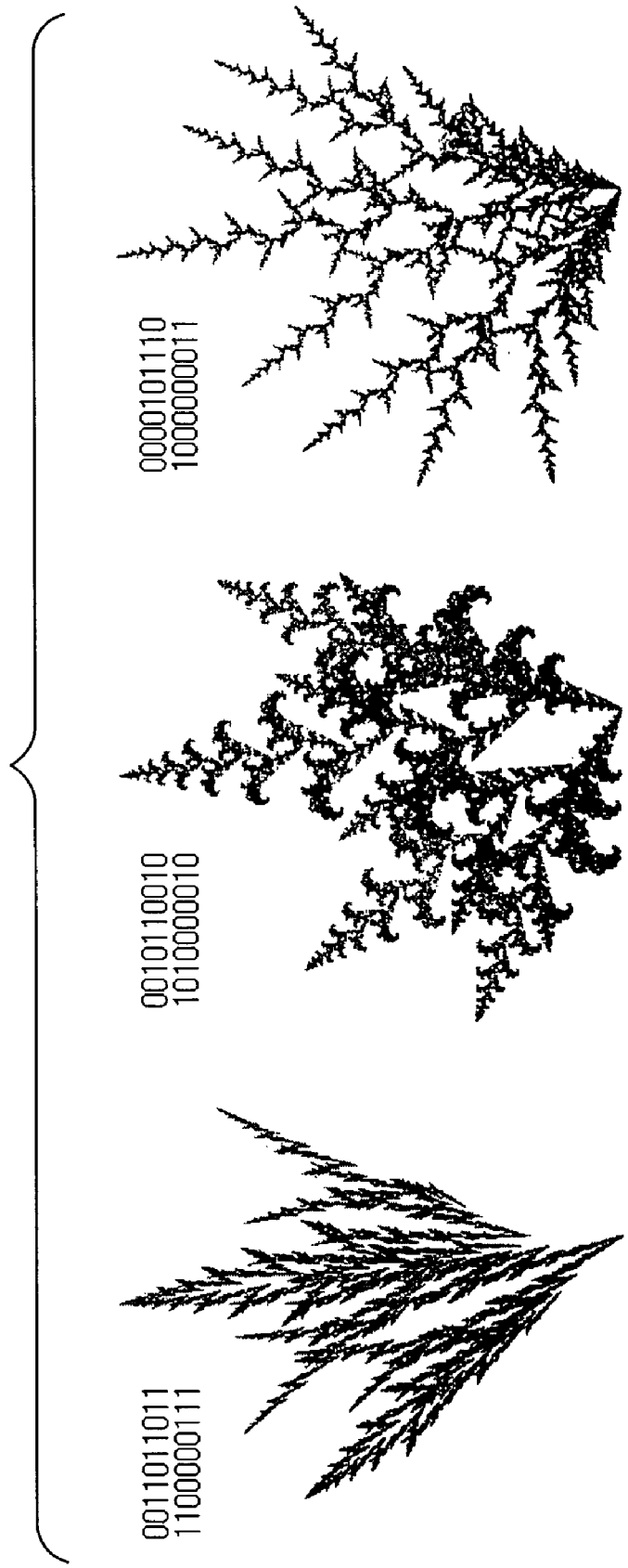
FIG. 10 is a view for explaining a sub-self-similar set (4) in the second example of the exemplary embodiment.
Figure 11:
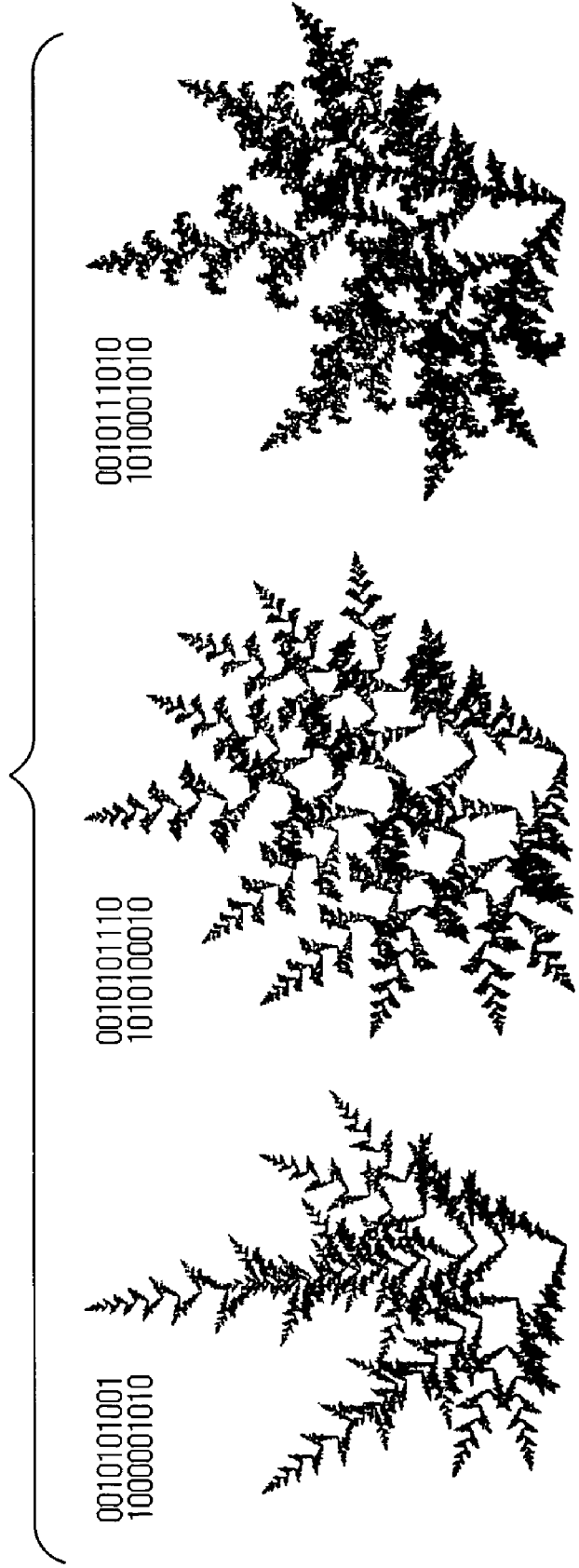
FIG. 11 is a view for explaining a sub-self-similar set (5) in the second example of the exemplary embodiment.
Figure 12:
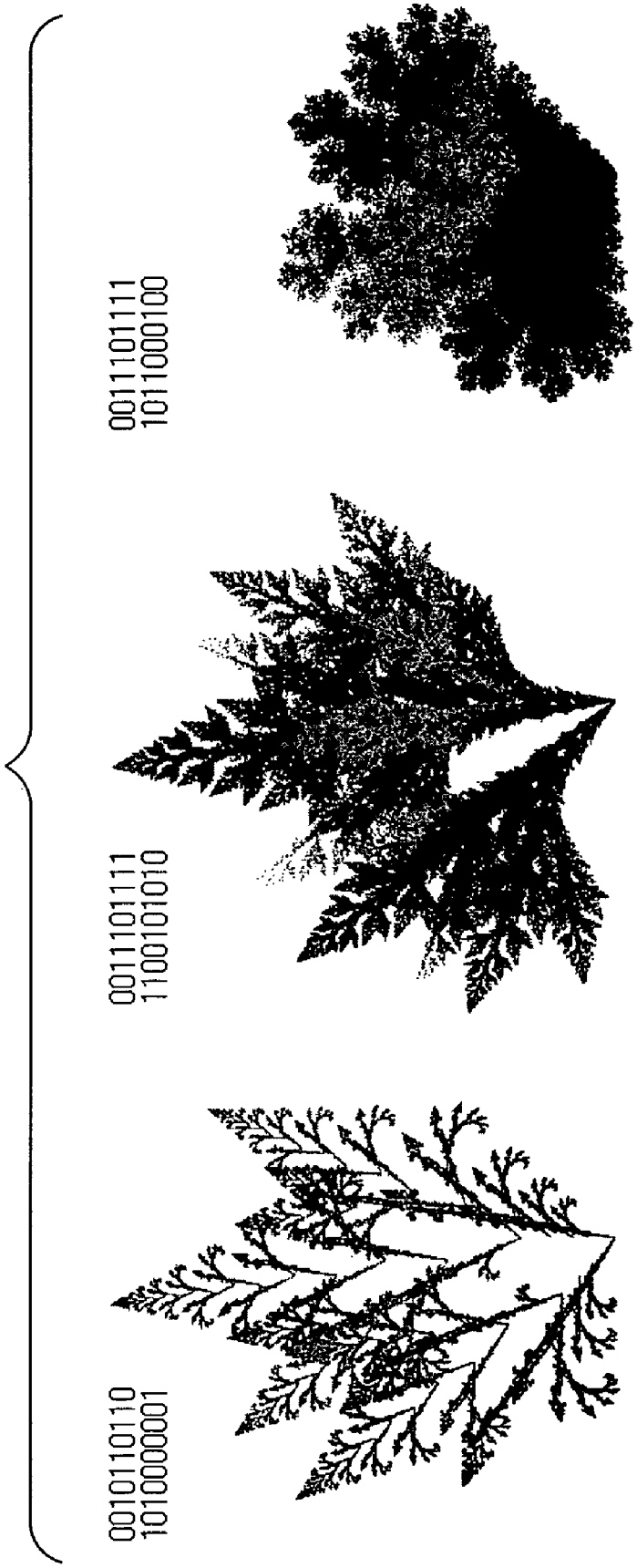
FIG. 12 is a view for explaining a sub-self-similar set (6) in the second example of the exemplary embodiment.
Figure 13:
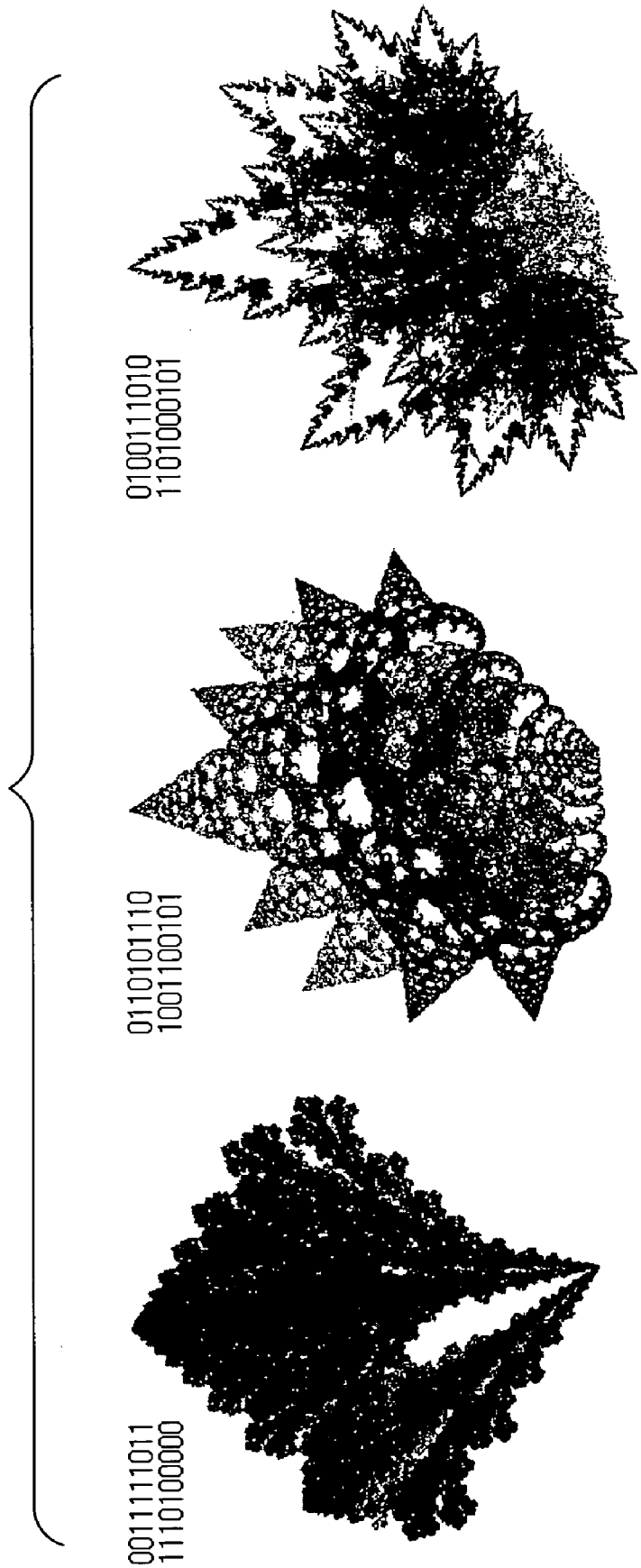
FIG. 13 is a view for explaining a sub-self-similar set (7) in the second example of the exemplary embodiment.

In this case, the self-similar set designating section 10 constructs a self-similar set A (=$f_1(A) \cup f_2(A)$) shown in FIGS. 6 and 14(1). It is noted that the entire pattern of FIG. 6 surrounded by the dashed lines indicates the self-similar set A, a part of the entire pattern of FIG. 6 surrounded by the chain lines indicates f1(A) and another part of the entire pattern of FIG. 6 surrounded by the two-dot chain lines indicates f2(A).

In other words, the pattern denoted by f1(A) is painted in deeper black, and the pattern denoted by f2(A) is painted in lighter black.

In the second example, a rate occupied by the overlap portion $f_1(A) \cap f_2(A)$ in the self-similar set $A=f1(A) \cup f_2(A)$ is to some extent high and the self-similar set A is formed as an arcwise connected set. Incidentally, because the self-similar set A of the second example is low in the reduction ratio of the contraction maps f1 and f2 and thus wide in the overlap portion $f_1(A) \cap f_2(A)$, it can be said that the aforementioned density equalization method is suitable for drawing this self-similar set.

The second example can be typically shown in FIGS. 14 and 15. Refer to FIGS. 14 and 15 suitably (incidentally, the specific address shown in FIGS. 14 and 15 may be different from that described below.)

First, the base-address-set designating section 11 requests a user to select and input an arbitrary point x from the overlap portion $f_1(A) \cap f_2(A)$ of the self-similar set A, and then the base-address-set designating section 11 calculates overlap addresses of the input point x. On this occasion, the base-address-set designating section 11 calculates the overlap addresses as approximate addresses. That is, the base-address-set designating section 11 selects an address of $s_1=1$ and an address of $t_1=2$ on the assumption that $$s_1 s_2 \ldots s_d$$

$$t_1 t_2 \ldots t_d$$

are elements of $S^d = \{1, \ldots, n\}^d$. Then, by letting $$s = s_1 s_2 \ldots s_d(1)$$

$$t = t_1 t_2 \ldots t_d(2),$$

s and t are the approximate addresses of x.

Incidentally, each numerical value per se in parentheses is not limited to the aforementioned value. For example, (12) may be used instead of (1) or (2). For example, the following calculation procedure can be used as a specific method for calculating s and t.

[Step 1] Set an effective depth d (e.g. d=10).
[Step 2] Map an arbitrary point y (fixed) on A by $fu_1 fu_2 \ldots fu_d$. In this step, u is calculated for all points of $u \in S^d$.
[Step 3] Select two values of $u_1 u_2 \ldots u_d$ at $u_1=1$ and $u_1=2$ among u with sufficiently small $|x - fu_1 fu_2 \ldots fu_d(y)|$ and put the two values as $s_1 s_2 \ldots s_d$ and $t_1 t_2 \ldots t_d$.

Incidentally, when a fixed point is mapped for all addresses by the method of the step 2 in the case where the arcwise connected self-similar set is provided or the reduction ratio is low, the rate mapped to a specific portion of the self-similar set becomes generally high. Therefore, the point may be mapped to the whole of the self-similar set uniformly by a method like the density equalization method so that the approximate address $s_1 s_2 \ldots s_d, t_1 t_2 \ldots t_d$ can be calculated efficiently (speedily) Incidentally, an address approximate to that of x can be given more accurately as the value of d increases. In this manner, the base set address designating section 11 calculates the overlap addresses of the point x approximately (see FIG. 14(2)). Incidentally, there is no barrier to the following construction of a sub-self-similar set even in the case where the address value cannot be calculated accurately.

Next, the base set address designating section 11 obtains a base address set M based on the overlap approximate addresses ($s = s_1 s_2 \ldots s_d(1)$, $t = t_1 t_2 \ldots t_d(2)$) of the single point x selected from the overlap portion $f_1(A) \cap f_2(A)$ of the self-similar set A by using the following definition of the base address set M:

$$M = \{s_1 s_2 \ldots s_d(1), t_1 t_2 \ldots t_d(2)\}$$

Then, the generation-rule acquiring section 12 obtains a generation address set P based on the following definition of the generation address set P:

$$P = \cup_{i=1}^{\infty} \sigma^i(M)$$

A sub-self-similar set will be formed below in accordance with this generation address set P.

The generation-rule acquiring section 12 obtains a sofic system, which constructs a sub-self-similar set G in a self-similar set B on the assumption that when let $g1, \ldots, gn$ be a group of hypothetical contraction maps, an overlap portion of the self-similar set B with respect to the group of hypothetical contraction maps $g1, \ldots, gn$ coincides with $\phi_g(M)$, that is, on the assumption that $\phi_g(M) = g_1(B) \cap g_2(B)$. Although a sofic system can be obtained by manual calculation in the first example, the second example requires a more general method for obtaining a sofic system. Generally, the total number of $Q_1, \ldots, Q_k$ forming the sofic system increases to make it difficult to calculate the sofic system easily as the number of elements of P increases.

An example of the general method for obtaining a sofic system in the second example will be described below. For this end, there is used the property that two projected points, which are obtained when arbitrary two elements of P are projected onto the self-similar set B by $\phi_g$ on the assumption that $P = \cup_{i=1}^{\infty} \sigma^i(M)$ is finite, are connected to each other by a unique route on B. Therefore, for arbitrary two points ω and τ in the generation address set P, a group of sub-self-similar sets $\{G_i\}$ for forming a sub-self-similar set G in the self-similar set B is obtained on the basis of the top address values $\omega_1$ and $\tau_1$ (both taking a value of 1 or 2) of the two points. More specifically, the group of sub-self-similar sets $\{G_i\}$ is obtained by the following processing steps.

[Step 1] i=1.
[Step 2] When $\omega_1 = \tau_1$, the unique route connecting $\phi_g(\omega)$ and $\phi_g(\tau)$ on the self-similar set B does not contain any point in $\phi_g(M)$ Therefore, put this route as $G_i$. Let i=i+1.
[Step 3] When $\omega_1 \neq \tau_1$, the unique route connecting $\phi_g(\omega)$ and $\phi_g(\tau)$ on the self-similar set B contains a point in $\phi_g(M)$. Therefore, put this route as a route $G_i$ for connecting $\phi_g(\omega)$ and $\phi_g(M)$ and a route $G_{i+1}$ for connecting $\phi_g(M)$ and $\phi_g(\tau)$. Let i=i+2.
[Step 4] Return to the step 2 and process next two points of P.

The relation $G = \cup_{i=1}^{k} G_i$ holds with respect to the subsets $\{G_i\}$ of G determined in the aforementioned manner. Accordingly, sets $Q1, \ldots, Qk$ can be determined automatically when the interaction of $\{G_i\}$ is obtained as follows.

$$G_i = \{g_l(G_j)(l,j) \in Q_i\} \text{ for } i=1, \ldots, k$$

The sets $Q1, \ldots, Qk$ are as follows.

$$Q_1 \subset \{1, \ldots, n\} \times \{1, \ldots, k\}, Q_i \neq \Phi$$

In this manner, the sofic system can be obtained. More specifically, each $G_i$ is defined as the unique route to connect some two points of $\phi_g(P)$, which is the projection of $P = \cup_{i=1}^{\infty} \sigma^i(M)$ onto the self-similar set B. When addresses of two end points of $G_i$ are let as ω and τ, the top address values of the two end points satisfy the relation $\omega_1 = \tau_j$ from view of the deciding way in the steps 2 and 3. Accordingly, $G_i$ can be expressed in the form of $G_i = g_{\omega 1}(H)$. On this occasion, H is the unique curve for connecting $\phi_g(\omega_2 \omega_3 \ldots)$ and $\phi_g(\tau_2 \tau_3 \ldots)$ on the self-similar set B. Because of $\omega_2 \omega_3 \ldots, \tau_2 \tau_3 \ldots \in M$, H coincides with any $G_j$ (case of the step 2) or any $G_j \cup G_{j+1}$ (case of the step 3) from view of the definition of the generation address set P. Accordingly, $G_i$ can be expressed in the following form.

$$G_i = g_{\omega 1}(G_j) \text{ or}$$

$$G_i = g_{\omega 1}(G_j \cup G_{j+1}) = g_{\omega 1}(G_j) \cup g_{\omega 1}(G_{j+1})$$

Because these equation satisfies the relational equation of $\{G_i\}$ to be satisfied for the sofic system, the sofic system can be obtained finally if such calculation is applied to all $G_i$ to obtain $\{Q_i\}$. Although this example shows the case where all routes each connecting two points in P are subjects of processing, the processing need not to applied to the all routes and may be applied to the required minimum satisfying $G = \cup_{i=1}^{k} G_i$.

According to the thus constructed sofic system, the generation-rule acquiring section 12 generates a hypothetical sub-self-similar set G in the self-similar set in the aforementioned manner. Thereafter, the sub-self-similar set acquiring section 13 generates a sub-self-similar set F in the self-similar set A according to the rule of the sofic system. Incidentally, also in this second example, the sub-self-similar set acquiring section 13 may generate the sub-self-similar set F by the random iteration algorithm with providng a mapping rule using a directed graph, as described in the first example. However, respective pieces $\{F_i\}$ are generally different in size. Therefore, it is necessary to set a probability in the mapping rule for more accurate drawing. On this occasion, the sub-self-similar set acquiring section 13 may obtain the characteristic values or characteristic vectors of a matrix determined by the sofic system, obtain the "pseudo-Hausdorff dimension" of the sub-self-similar set F and apply weighting determined by the pseudo-Hausdorff dimension to each piece $\{F_i\}$ forming the sub-self-similar set F to thereby generate the sub-self-similar set F. Then, the image drawings section 14 draws the thus generated sub-self-similar set F. Incidentally, the term "pseudo-Hausdorff dimension" means a numerical value obtained by use of the same calculation equation as that of the Hausdorff dimension, which can be calculated accurately when contraction maps satisfy the "open set condition". Generally, because contraction maps with an arcwise connected self-similar set does not always satisfy the open set condition, we call the value "pseudo-Hausdorff dimension" for a convenience.

Each of FIGS. 7 to 13 show an example in which a user selects and inputs a desired single point from the overlap portion $f_1(A) \cap f_2(A)$ of the self-similar set A shown in FIG. 6, the self-similar set designating section 10 calculates overlap approximate addresses of the respective selected points in the above manner, the base-address-set designating section 11 generates base address sets M for the respective selected points, the generation-rule acquiring section 12 calculates generation address set P for the respective selected points and the sub-self-similar set acquiring section 13 generates sub-self-similar sets F for the respective selected points. It is noted that the selected points in the respective examples shown in FIGS. 7 to 13 are different from each other. Since the computer 101 generates each sub-self-similar set F for an address of a corresponding point in the overlap portion, each obtained sub-self-similar set F is provided as an acrwise connected set again. It can be confirmed that the self-similar set A shown in FIG. 6 is a leaf-like set whereas the sub-self-similar sets F, which are subsets of the self-similar set A, exhibit various tree-like forms. In other words, according to the method of the exemplary embodiment, various forms can be obtained deterministically if two addresses can be given to a self-similar set.

As shown in FIGS. 7 to 13, the various tree-like sub-self-similar sets F are obtained as subsets of the leaf-like self-similar set A shown in FIG. 6. It is a matter of course that the form of the obtained sub-self-similar set F changes if the form of the self-similar set A itself is changed, that is, if contraction maps are selected variously. As is obvious from the above description, variation in the form of the sub-self-similar set F is wider than that in the form of the self-similar set A. Therefore, a higher effect can be fulfilled in copying of a natural form or in other applied fields. For example, the exemplary embodiment may be applied to the field of encryption. If a self-similar set A itself is used as a key, it is possible to form a sub-self-similar set F, which can serves as a subject first when the address of a point selected from the overlap portion is used as a second key. Accordingly, the exemplary embodiment may be used as a double key. Moreover, in the second example, when a point of the overlap portion on the self-similar set A is apparently designated by the user, a sub-self-similar set corresponding to the point can be drawn. Because the sub-self-similar set F can be obtained in an interactive manner such as a trial and error manner, it can be said that the second example is useful for obtaining a form according to user's intention. Alternatively, the base-address-set designating section 11 may designate one point from the overlap portion of the self-similar set A and generate the base address set M.

THIRD EXAMPLE

Next, a third example of the exemplary embodiment of the invention will be described. In the third example, only the method of selecting a base address set M is modified while the same group of contraction maps as that in the second example is selected. That is, the second example has shown the case where M is a set of addresses of a point selected from the overlap portion of A, whereas the third example shows the case where M is processed as an arbitrary address.

Figure 16:
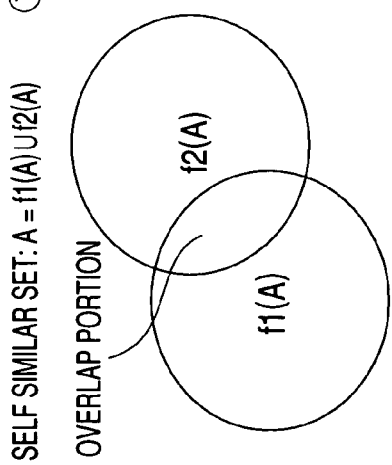
FIG. 16 is a view for typically explaining a third example of the exemplary embodiment.

FIGS. 16 and 17 schematically show the third example where a sub-self-similar set F is generated from an arbitrary address (incidentally, the specific address shown in FIGS. 16 and 17 may be different from that described below). It is noted that FIG. 17 is the same as FIG. 15.

First, an effective depth d is set (e.g. d=10). The base-address-set designating section 11 obtains a base address set M as follows.

$$M = \{s_1 s_2 \ldots s_d(1), t_1 t_2 \ldots t_d(2)\}$$

Also, the generation-rule acquiring section 12 obtains a generation address set P as follows.

$$P = \cup_{i=1}^{\infty} \sigma^i(M)$$

(see FIG. 16(3)). Here, let $s_1 = 1$ and $t_1 = 2$, and each $s_i = 1$ and $t_i = 1$ ($1 < i \leq d$) in the following expression.

$$s = s_1 s_2 \ldots s_d(1)$$

$$t = t_1 t_2 \ldots t_d(2)$$

When the sub-self-similar set acquiring section 13 generates a sub-self-similar set F by the method described in the second example while changing respective values $s_i$ and respective value $t_i$, the form of the sub-self-similar set F changes variously according to change in $s_i$ and $t_i$. The form of the sub-self-similar set F does not always change continuously even if $s_i$ and $t_i$ change continuously. However, the form of the sub-self-similar set F can be changed continuously if a specific rule is provided. Moreover, the sub-self-similar set which changes in this manner can be used as an animation. Or the way of using M later may be made in such a manner that M is extracted when a preferred sub-self-similar set appears while the form is changed successively. Incidentally, the sub-self-similar set generated in Example 3 is not always arcwise connected because the base address set is not generated from the overlap point of A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus for generating a sub-self-similar set F, which is a subset of a self-similar set A with respect to a plurality of contraction maps $f_1, \ldots, f_n$ where n is a natural number and larger than 1, and for forming an image expressing the sub-self-similar set F, the apparatus including a processor, the processor comprising:
   a base-address-set designating section that selects m addresses each of which are formed of finite sequence $\{1, \ldots, n\}$ and generates a base address set M including the selected m addresses;
   a generation-rule acquiring section that acquires a rule of generating a hypothetical sub-self-similar set G, which is a subset of a hypothetical self-similar set B with respect to n hypothetical contraction maps $g_1, \ldots, g_n$, by using the generated base address set M; and
   a sub-self-similar set generating section that generates a sub-self-similar set F, which is a subset of the self-similar set A, by applying the acquired generation rule to the plurality of contraction maps $f_1, \ldots, f_n$.

2. The apparatus according to claim 1, further comprising:
   a self-similar set designating section that allows a user to input the plurality of contraction maps $f_1, \ldots, f_n$ and generates the self-similar set A with respect to the plurality of contraction maps $f_1, \ldots, f_n$ inputted by the user.

3. The apparatus according to claim 2, wherein:
   the self-similar set designating section allows the user to select p points from an overlap portion of at least two of $f_1(A), \ldots, f_n(A)$, and
   the m addresses with p<m selected by the base-address-set designating section correspond to the p points selected by the user.

4. The apparatus according to claim 2, wherein:
   the self-similar set designating section allows the user to select m addresses, and
   the m addresses selected by the base-address-set designating section correspond to the m addresses selected by the user.

5. The apparatus according to claim 1, further comprising:
   an image drawing section that forms the image based on the sub-self-similar set F.

6. The apparatus according to claim 1, wherein the generation-rule acquiring section selects the hypothetical contraction maps $g_1, \ldots, g_n$ so that entire addresses of an overlap portion of $g_1(B), \ldots, g_n(B)$ coincide with the base address set M.

7. The apparatus according to claim 1, wherein the generation-rule acquiring section determines a generation address set P which is the projection of the whole backward shift of the base address set M onto the hypothetical self-similar set B, to hypothetically determine the sub-self-similar set G as the smallest sub-continuum of the self-similar set B which include a generation address set P.

8. The apparatus according to claim 1, wherein:
   the generation-rule acquiring section determines a sofic system to hypothetically determine the sub-self-similar set G as a sum of finite number of subsets $G_i$.

9. The apparatus according to claim 1, wherein the self-similar set A with respect to the n contraction maps $f_1, \ldots, f_n$ is arcwise connected.

10. The apparatus according to claim 9, wherein:
    the self-similar set designating section that allows a user to select p points of a plurality of points from an overlap portion of the self-similar set A, and
    the base-address-set designating section adopts whole pseudo addresses of the user-selected p points of the plurality of points as the base address set M.

11. The apparatus according to claim 1, wherein the base-address-set designating section selects the base address set M so that the sub-self-similar set G does not contain any closed curve.

12. The apparatus according to claim 1, wherein the sub-self-similar set generating section maps the sub-self-similar set F predetermined number of times by the respective plurality of contraction maps $f_1, \ldots, f_n$ to form a new sub-self-similar set.

13. An image processing method for generating a sub-self-similar set F, which is a subset of a self-similar set A with respect to a plurality of contraction maps f1, . . . , fn where n is a natural number and larger than 1, and for forming an image expressing the sub-self-similar set F, the method comprising the following steps implemented by a processor:
    selecting m addresses each of which are formed of finite sequence (1, . . . , n) and generates a base address set M including the selected m addresses;
    acquiring a rule of generating a hypothetical sub-self-similar set G, which is a subset of a hypothetical self-similar set B with respect to n hypothetical contraction maps g1, . . . , gn, by using the generated base address set M; and
    generating a sub-self-similar set F, which is a subset of the self-similar set A, by applying the acquired generation rule to the contraction maps f1, . . . , fn.

14. A non-transitory computer readable medium storing a program causing a computer to execute a process for generating a sub-self-similar set F, which is a subset of a self-similar set A with respect to a plurality of contraction maps f1, . . . , fn where n is a natural number and larger than 1, and for forming an image expressing the sub-self-similar set F, the process comprising:
    selecting m addresses each of which are formed of finite sequence $\{1, \ldots, n\}$ and generates a base address set M including the selected m addresses;
    acquiring a rule of generating a hypothetical sub-self-similar set G, which is a subset of a hypothetical self-similar set B with respect to n hypothetical contraction maps g1, . . . gn, by using the generated base address set; and
    generating a sub-self-similar set F, which is a subset of the self-similar set A, by applying the acquired generation rule to the contraction maps f1, . . . , fn.

* * * * *